United States Patent [19]
Behnke et al.

[11] Patent Number: 5,230,860
[45] Date of Patent: Jul. 27, 1993

[54] REACTOR VESSEL CAVITY SEAL PLATE

[75] Inventors: Harold W. Behnke, Lynchburg; Larry D. Dixon, Forest; James E. McCann, Lynchburg, all of Va.

[73] Assignee: B&W Nuclear Service Company, Lynchburg, Va.

[21] Appl. No.: 875,957

[22] Filed: Apr. 30, 1992

[51] Int. Cl.⁵ .......................................... G21C 13/00
[52] U.S. Cl. .................................. 376/203; 376/205; 376/294
[58] Field of Search ............... 376/203, 205, 294, 266; 976/DIG. 178, DIG. 166, DIG. 186, DIG. 169

[56] References Cited

U.S. PATENT DOCUMENTS

| | | | |
|---|---|---|---|
| 3,633,784 | 1/1972 | Taft | 376/203 |
| 4,000,595 | 1/1977 | Fortescue | 52/302 |
| 4,904,442 | 2/1990 | Swidwa et al. | 376/203 |
| 4,905,260 | 2/1990 | Swidwa et al. | 376/203 |
| 5,102,612 | 4/1992 | McDonald et al. | 376/203 |

Primary Examiner—Donald P. Walsh
Assistant Examiner—Meena Chelliah
Attorney, Agent, or Firm—Robert J. Edwards; D. Neil LaHaye

[57] ABSTRACT

A nuclear reactor vessel cavity seal plate. An annular support plate is positioned over the cavity between the reactor vessel and the shield structure. The inner diameter of the support plate rests freely upon the reactor vessel flange to allow movement of the vessel thereunder during thermal expansion and contraction. A flexible annular seal positioned over the support plate has its inner diameter seal welded to the reactor vessel flange and its outer diameter seal welded to the shield structure. Matching ports in the support plate and seal provide access to nuclear instruments below the support plate. A mounting block around each port accepts a cover plate that seals the port. This provides a permanent seal plate that allows flooding of the cavity for refueling with it only being necessary to remove the cove plates for normal reactor operations.

2 Claims, 2 Drawing Sheets

REACTOR VESSEL CAVITY SEAL PLATE

BACKGROUND OF THE INVENTION

1. Field of the Invention

The present invention is generally related to nuclear reactor installations and more particularly to a reactor vessel cavity seal plate.

2. General Background

Commercial nuclear reactor vessels are positioned inside a cavity of a reactor shield structure such that there is an annular space between the reactor vessel and the shield structure. The annular space has instruments positioned therein for monitoring reactivity, accommodates thermal expansion of the reactor during operations, and provides a path for air flow from the bottom of the reactor vessel. Prior to refueling the reactor, the upper portion of the annular space is flooded with borated water to provide neutron shielding while the reactor vessel head is removed. To protect instrumentation in the lower portion of the space it is necessary to install a seal plate over the space before the water is added. The inner diameter of the seal plate rests upon the reactor vessel flange and the outer diameter is bolted to the shield structure. After refueling is completed the borated water is drained from the space and the seal plate is removed and stored to allow air flow from below the reactor. During normal reactor operations the reactor vessel is subject to radial and axial thermal expansion. Seal plates currently in use for refueling operations can not be left installed around the reactor vessel and shield structure after refueling because they are unable to accommodate the thermal expansion of the reactor vessel. Attempts at developing a permanent seal plate that does not require removal after refueling have incorporated a bellows that would accommodate the thermal expansion of the reactor vessel. This has proven to be unacceptable because the bellows traps water after the space is drained. The trapped water must then be manually removed by plant personnel, resulting in increased exposure to personnel and additional equipment maintenance. Seal plates that can not be left installed around the reactor between refuelings also present the problem of requiring storage space during the interim between refuelings. From the above it can be seen that a need exists for a reactor vessel cavity seal plate that does not have to be removed between refuelings. Such a plate must accommodate thermal expansion of the reactor, provide the necessary liquid seal during refueling operations, provide access to monitoring instruments below the plate during reactor operations, and allow air flow from below the reactor.

SUMMARY OF THE INVENTION

The present invention addresses the above needs in a straightforward manner. What is provided is a reactor vessel cavity seal plate that can be left in its installed position during normal reactor operations. An annular support plate formed from several sections has inner and outer spacer rings that respectively rest on the reactor vessel flange and the shield structure. A plurality of ports are provided in the support plate. A relatively thin annular seal rests upon the support plate and extends beyond the inner and outer diameter of the support plate. Inner and outer seal rings attached to the inner and outer diameter of the seal are respectively attached to the reactor vessel flange and the liner on the shield structure. The seal is provided with ports corresponding to those in the support plate. Mounting blocks on the seal receive cover plates that seal the ports during refueling operations. The support plate and seal move independently of one another. The reactor vessel flange slides under the inner spacer ring while the seal flexes and bows over the support plate during thermal expansion of the reactor vessel.

BRIEF DESCRIPTION OF THE DRAWINGS

For a further understanding of the nature and objects of the present invention, reference should be had to the following description taken in conjunction with the accompanying drawings in which like parts are given like reference numerals, and wherein.

DETAILED DESCRIPTION OF THE PREFERRED EMBODIMENT

Figure 1:
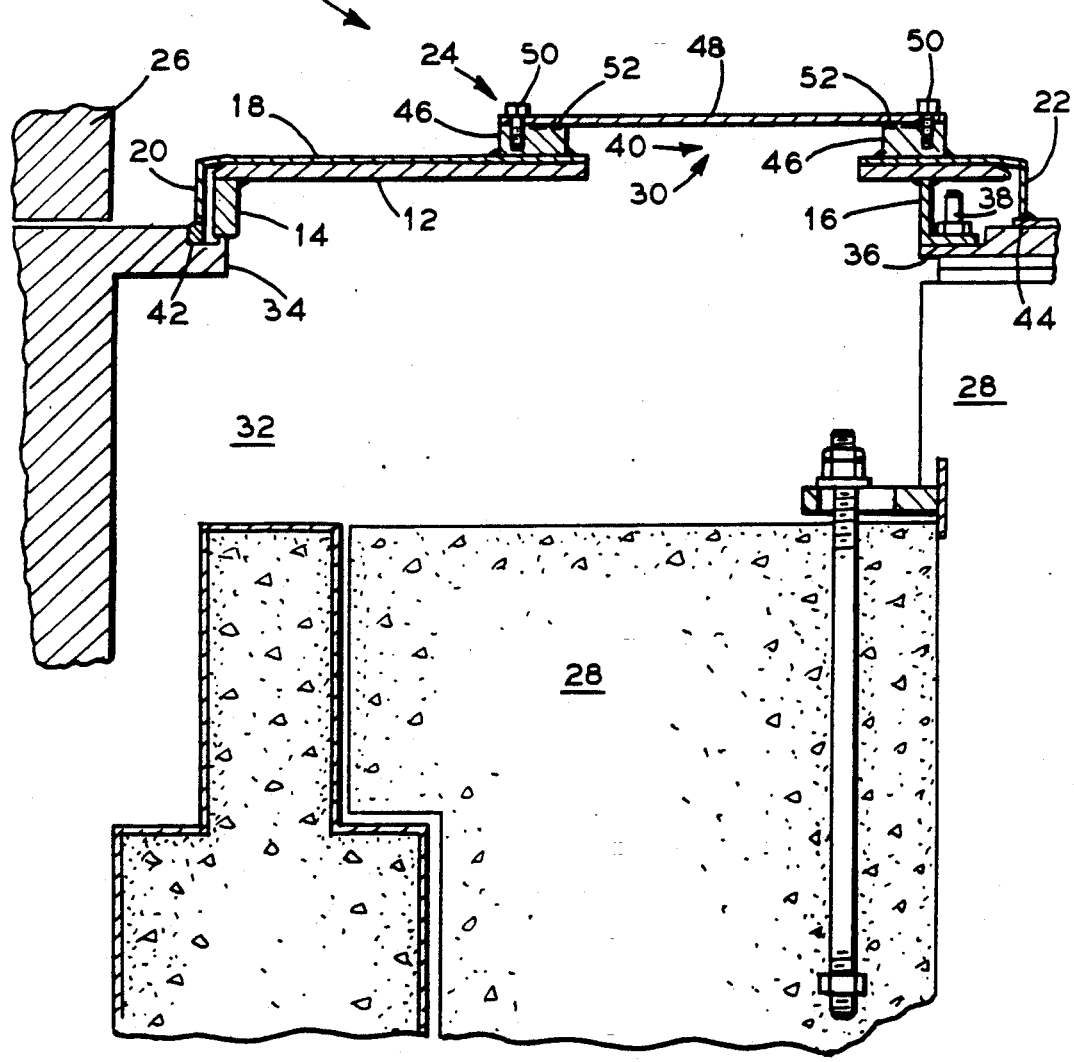
FIG. 1 is a side sectional view of the invention.

Referring to the drawings, it is seen in FIG. 1 that the invention is generally indicated by the numeral 10. Reactor vessel cavity seal plate 10 is generally comprised of annular plate 12, inner spacer ring 14, outer spacer ring 16, annular seal 18, inner seal ring 20, outer seal ring 22, and means 24 for covering and sealing ports in annular plate 12.

Annular plate 12 is preferably formed from a sturdy material such as one inch thick steel for withstanding the weight of the water when the space between reactor vessel 26 and shield structure 28 is flooded. Annular plate 12 is formed from a plurality of plates shaped such that they form annular plate 12 when positioned adjacent each other around reactor vessel 26. For ease of description, annular plate 12 will be referred to as a single item since the plurality of plates forming it all have a similar structure. Annular plate 12 is provided with a plurality of ports 30 spaced around its circumference. Ports 30 provide access to nuclear instruments positioned therebelow in annular cavity 32 between reactor vessel 26 and shield structure 28 and also allow circulation of air from beneath reactor vessel 26 during normal reactor operations. Annular plate 12 is provided with spacer rings 14, 16 that extend axially therefrom. Spacer rings 14, 16 may be separate pieces attached to annular plate 12 or they may be integral with annular plate 12. Inner spacer ring 14 may be fabricated from bar stock rolled to the proper diameter and extends from the inner diameter of annular plate 12. As seen in FIG. 1, inner spacer ring 14 rests freely upon reactor vessel flange 34. Outer spacer ring 16 may be fabricated from angle stock rolled to the proper diameter and extends from adjacent the outer diameter of annular plate 12. Outer spacer ring 16 rests upon cavity shield ring 36. Outer spacer ring 16 is provided with holes that match the position of shield ring studs 38 so that studs 38 do not have to be removed during installation of annular plate 12.

Figure 2:
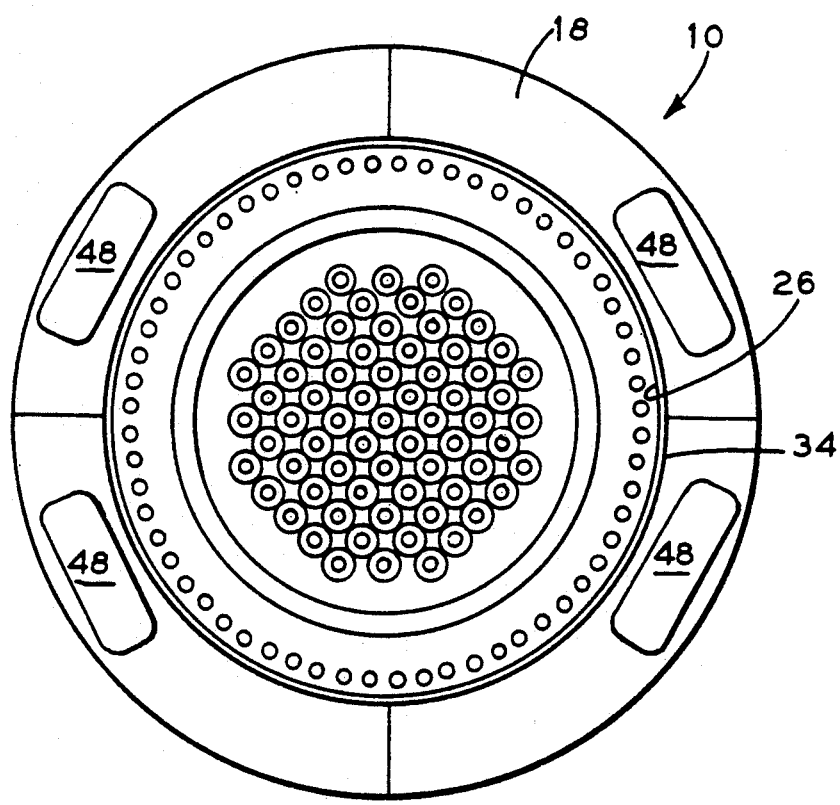
FIG. 2 is a plan view that schematically illustrates the invention installed around a reactor vessel.

Annular seal 18, like annular plate 12, is formed from a plurality of sections. This is schematically illustrated in FIG. 2. Once the sections are in position on top of annular plate 12, their adjoining edges are welded together over a backing strip to prevent annular seal 18 from being welded to annular plate 12. In the preferred embodiment, four 90 degree sections are welded together to form annular seal 18. One-eighth inch stainless steel is used to form annular seal 18 in the preferred embodiment. This provides the necessary corrosion resistance and flexibility. As seen in FIG. 1, annular seal 18 has a smaller inner diameter and larger outer diameter than annular plate 12 such that annular seal 18 extends beyond the edges of annular plate 12. Inner and outer seal rings 20, 22 extend axially from the inner and outer diameter of annular seal 18. Inner and outer seal rings 20, 22 are preferably formed from the same material as annular seal 18 and may be integral therewith or separate parts attached thereto. Annular seal 18 is provided with cutouts 40 that match ports 30 in annular plate 12. Inner seal ring 20 is seal welded to reactor vessel flange 34 as indicated at numeral 42. Outer seal ring 22 is seal welded to the stainless steel canal liner plate 44. This provides a watertight seal around the outer and inner diameter of annular seal 18.

Means 24 for removably covering and sealing ports 30 and cutouts 40 is comprised of mounting blocks 46 and cover plates 48. A mounting block 46, preferably formed from stainless steel, is seal welded to annular seal 18 around each port 30 and cutout 40. Mounting blocks 46 are tapped to threadably receive bolts 50. Gasket 52 is positioned on the top of mounting blocks 46. A cover plate 48 is bolted above each port 30 against gasket 52 and mounting block 46.

In operation, a plurality of plates are positioned adjacent one another around reactor vessel 26 to form annular plate 12. Inner spacer ring 14 rests freely upon reactor vessel flange 34. Annular seal 18, formed from a plurality of sections welded together at adjoining edges, rests freely upon annular plate 12. Inner and outer seal rings 20, 22 are respectively seal welded to reactor vessel flange 34 and the stainless steel canal liner plate 44 of shield structure 28. To begin refueling operations, cover plates 48 are bolted to mounting blocks 46 to cover ports 30 in annular plate 12. The area above reactor vessel cavity seal plate 10 may then be flooded with borated water to provide neutron shielding before the reactor vessel head is removed. The seal provided by the invention prevents nuclear instruments positioned at the lower exterior of the reactor from being damaged by the water. The steel used for annular plate 12 provides the necessary support for the weight of the water. After refueling operations are completed and the reactor vessel head replaced, the borated water is drained. Cover plates 48 may then be removed and stored to allow access to the nuclear instruments and air flow from beneath the reactor vessel. Although cover plates 48 are stored between refueling operations, they present much less difficulty for installation, removal, and storage as opposed to an entire seal assembly. The cover plates 48 are smaller and lighter than previously used sections of seal assemblies and thus greatly reduce clearance and special hoisting procedures previously needed.

The remainder of reactor vessel cavity seal plate 10 stays in its installed position. During normal reactor operations the reactor vessel will grow axially as much as 1.59 inches and radially as much as 0.44 inch. Since inner spacer ring 14 rests freely on reactor vessel flange 34, the reactor vessel flange will simply slide beneath inner spacer ring 14 during expansion and contraction of reactor vessel 26. Annular seal 18 is flexible enough to bow over annular plate 12 during this expansion and flattens out again when reactor vessel 26 contracts.

Because many varying and differing embodiments may be made within the scope of the inventive concept herein taught and because many modifications may be made in the embodiment herein detailed in accordance with the descriptive requirement of the law, it is to be understood that the details herein are to be interpreted and not in a limiting sense.

What is claimed as invention is:

1. In a nuclear reactor vessel installation where there is an annular cavity between a reactor vessel having a flange extending radially therefrom and a reactor shield structure, a reactor vessel cavity seal plate, said seal plate comprising:
   a. an annular plate formed from a plurality of unattached segments positioned adjacent each other, said annular plate having a plurality of ports spaced around its circumference;
   b. an inner spacer ring attached to the inner diameter of said annular plate and resting freely upon the reactor vessel flange;
   c. an outer spacer ring attached adjacent the outer diameter of said annular plate and resting upon the reactor shield structure;
   d. an annular seal formed from a plurality of sections welded together such that said annular seal rests upon said annular plate and extends beyond the inner and outer diameter of said annular plate;
   e. an inner seal ring attached to the inner diameter of said annular seal and sealingly attached to the reaction vessel flange;
   f. an outer seal ring attached to the outer diameter of said annular seal and sealingly attached to the reactor shield structure; and
   g. means for removably covering and sealing the ports in said annular plate.

2. The seal plate of claim 1, wherein said means for removably covering and sealing the ports in said annular plate comprises:
   a. a mounting block attached to said annular seal around each port in said annular plate; and
   b. a cover plate removably attachable to each of said mounting blocks.

* * * * *